J. E. REDFERN.
PEDAL PAD.
APPLICATION FILED NOV. 26, 1917.

1,302,853. Patented May 6, 1919.

Witness
Robt. Hoge

Inventor
J. E. Redfern
By H. B. Willson & Co.
Attorneys

UNITED STATES PATENT OFFICE.

JOHN EDWARD REDFERN, OF CAMBRIDGE, MASSACHUSETTS.

PEDAL-PAD.

1,302,853.     Specification of Letters Patent.     Patented May 6, 1919.

Application filed November 26, 1917. Serial No. 204,027.

*To all whom it may concern:*

Be it known that I, JOHN E. REDFERN, a citizen of the United States, residing at Cambridge, in the county of Middlesex and State of Massachusetts, have invented certain new and useful Improvements in Pedal-Pads; and I do declare the following to be a full, clear, and exact description of the invention, such as will enable others skilled in the art to which it appertains to make and use the same.

My invention has for its object to provide a simple and inexpensive pedal pad and with this object in view, the invention resides in the novel features of construction hereinafter fully described and claimed, the descriptive matter being supplemented by the accompanying drawing, which forms a part of this specification and in which:

Figure 1:
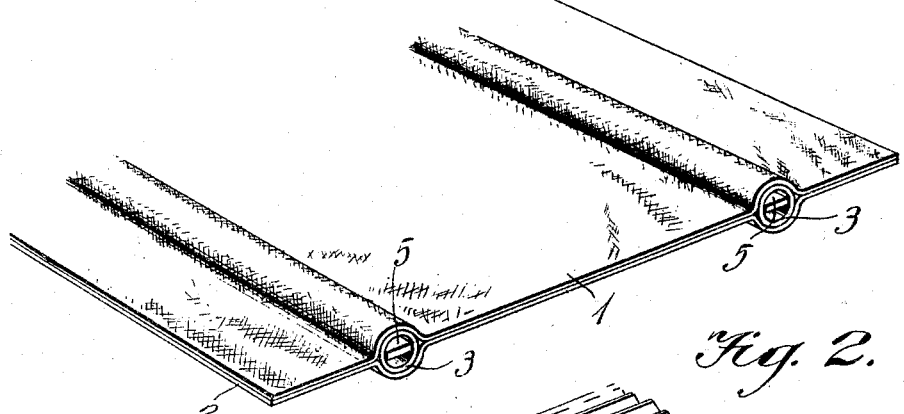
Figure 1 is a sectional perspective view of the base of the improved pad before vulcanizing.
Figure 2:
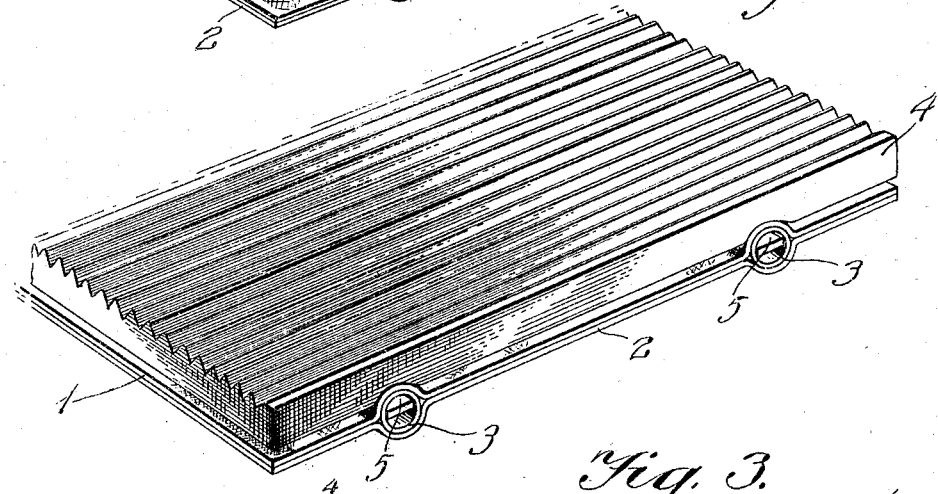
Fig. 2 is a sectional perspective view illustrating the pad body or tread applied to the base and in condition for vulcanizing.
Figure 3:
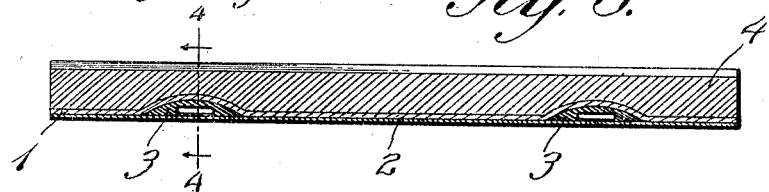
Fig. 3 is an enlarged section of the complete pad.
Figure 4:
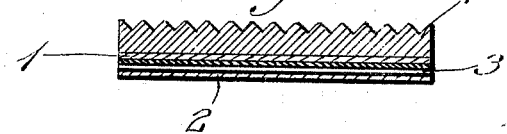
Fig. 4 is a sectional view at right angles to Fig. 3, taken on the plane indicated by the line 4—4 of this figure.

In the manufacture of the present article, upper and lower plies 1 and 2 of rubber impregnated fabric or any other preferred material are utilized to form a relatively tough attaching base, a suitable number of tubes 3 of rubber or other suitable vulcanizable material being interposed between said plies as shown in Fig. 1. This having been done, the pedal body or pad 4 is applied to the base as shown in Fig. 2.

After performing the operations above set forth, the entire assemblage is placed in a vulcanizing mold and baked at a suitable degree of heat, the result being that the tubes 3 are flattened and vulcanized to the plies 1 and 2, these plies are vulcanized together except where separated by said tubes, and the body 4 is vulcanized to the upper ply of the base, thus forming an integral structure.

During the vulcanizing operation suitable cores 5 or other suitable means are located in the tubes 3 to prevent closing of the latter, and after the vulcanizing operation, these cores may be removed to permit the passage of wires or the like through the openings thus formed, for the purpose of securing the pad to the foot pedal.

I intend to manufacture the structure above described in sheet form and to cut the same into pieces of different sizes, according to the uses for which the individual pads are to be used, and it is obvious that these uses are too numerous to set forth herein.

A good grade of rubber is preferably employed for the tube 3 and the pad body 4, but I wish it understood that any other preferred vulcanizable material now in use or later devised to serve as a substitute for rubber, may well be employed. Furthermore, although the plies 1 and 2 are by preference of processed fabric such as that commonly used in the construction of automobile tires, they may well be constructed of any fabric material which will meet with the requirements.

From the foregoing, taken in connection with the accompanying drawings, it will be obvious that although the article is of simple and inexpensive nature, it will nevertheless be of great advantage to prevent the slippage of the operator's feet upon numerous kinds of foot pedals. Since probably the best results are obtained from the exact features above set forth, they are preferably employed, but I wish it understood that within the scope of the invention as claimed, numerous minor changes may well be made.

I claim:—

1. A foot-pad comprising a relatively flat tough fabric base formed with an opening between its upper and lower sides and extending from one of its edges to its opposite edge to receive an attaching element, and a body of yielding friction creating material integral with said base.

2. A foot-pad comprising a flat body of yieldable friction creating material, and a base for said body including an upper and a lower ply of fabric, said plies being parallel and being secured together substantially throughout their areas but being separated on a line extending from one edge of the base to the opposite edge thereof, whereby to form an opening for the reception of an attaching element.

3. A foot-pad comprising a flat body of yieldable friction creating material, and a base for said body including an upper and a lower ply of fabric, said plies being disposed in parallel relation, and a substantially flat tube of vulcanized material between a restricted portion of said plies and having its ends located at two opposite edges of the base, said substantially flat tube being vulcanized to said plies and said plies being vulcanized together except where separated by said tube.

In testimony whereof I have hereunto set my hand in the presence of two subscribing witnesses.

JOHN EDWARD REDFERN.

Witnesses:
  JOHN F. BURDGE,
  JOHN R. BURDGE.

Copies of this patent may be obtained for five cents each, by addressing the "Commissioner of Patents, Washington, D. C."